United States Patent
Guthrie (12)

(10) Patent No.: US 6,266,681 B1
(45) Date of Patent: *Jul. 24, 2001

(54) METHOD AND SYSTEM FOR INSERTING CODE TO CONDITIONALLY INCORPORATE A USER INTERFACE COMPONENT IN AN HTML DOCUMENT

(75) Inventor: John Guthrie, Seattle, WA (US)

(73) Assignee: Network Commerce Inc., Seattle, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/827,691

(22) Filed: Apr. 8, 1997

(51) Int. Cl.$^7$ ............................. G06F 15/00; G06F 17/30
(52) U.S. Cl. .................. 707/501; 707/512; 707/513; 707/526; 707/10; 709/203
(58) Field of Search ..................... 707/513, 500, 707/10, 102, 103, 526, 512, 501, 203, 200; 395/702

(56) References Cited

U.S. PATENT DOCUMENTS

| | | | | |
|---|---|---|---|---|
| 5,572,643 | * | 11/1996 | Judson | 395/200.48 |
| 5,761,683 | * | 6/1998 | Logan et al. | 707/513 |
| 5,764,902 | * | 6/1998 | Rothrock | 709/205 |
| 5,802,530 | * | 9/1998 | Van Hoff | 707/513 |
| 5,822,539 | * | 10/1998 | Van Hoff | 709/236 |
| 5,826,025 | * | 10/1998 | Gramlich | 709/217 |
| 5,835,712 | * | 12/1998 | Dufresne | 709/203 |
| 5,835,914 | * | 11/1998 | Brim | 707/206 |
| 5,845,075 | * | 12/1998 | Uhler et al. | 709/218 |
| 5,890,158 | * | 3/1999 | House et al. | 707/10 |
| 5,890,171 | * | 3/1999 | Blumer et al. | 707/501 |

FOREIGN PATENT DOCUMENTS 0762297A 3/1997 (EP) ................................ G06F/17/24

OTHER PUBLICATIONS

Newsome, M. et al., "HyperSQL: web-based query interfaces for biological databases," Proceedings of the Thirtieth Hawaii International Conference on System Science, Wailea, HI, USA, Jan. 7–10, 1997, (abstract.).

* cited by examiner

Primary Examiner—Jean R. Homere
Assistant Examiner—Greta L. Robinson
(74) Attorney, Agent, or Firm—Perkins Coie LLP

(57) ABSTRACT

A method and system for injecting code into an existing HTML document that enables the conditional generation and incorporation of an injectable component is provided. The injection mechanism provided enables a user to display an add-on user interface component within a web page using a technique that is transparent to the normal processing within a browser application. The injection mechanism installs interceptor code as a proxy server between a client browser and a server. The interceptor code monitors all HTTP messages sent from the client browser and injects code into each HTML document that is sent from a server to the client browser. The injected code when executed by the client browser conditionally inserts HTML code into the received HTML document. The inserted HTML code is then used by the client browser to generate a new component, for example a user interface component. The code injected by the interceptor code is dependent upon the type of the browser and whether certain tags are present in the received HTML document. In addition, the code may be written in a script language, such as Javascript or VBscript.

34 Claims, 15 Drawing Sheets

METHOD AND SYSTEM FOR INSERTING CODE TO CONDITIONALLY INCORPORATE A USER INTERFACE COMPONENT IN AN HTML DOCUMENT

TECHNICAL FIELD

The present invention relates to transparently modifying an existing document and, in particular, to injecting code into an HTML document that conditionally generates a user interface component.

BACKGROUND OF THE INVENTION

Today's computer networking environments, such as the Internet, offer mechanisms for delivering documents between heterogeneous computer systems. One such network, the World Wide WEB network, which comprises a subset of Internet sites, supports a standard protocol for requesting documents known as WEB pages and for receiving them. This protocol is known as the Hypertext Transfer Protocol, or "HTTP." HTTP defines a high-level message passing protocol for sending and receiving packets of information between diverse applications. Details of HTTP can be found in various documents including T. Berners-Lee et al., *Hypertext Transfer Protocol*—HTTP 1.0, Request for Comments (RFC) 1945, MIT/LCS, May, 1996, which is incorporated herein by reference. Each HTTP message follows a specific layout, which includes amongst other information a header, which contains information specific to the request or response. Further, each HTTP request message contains a universal resource identifier (a "URI"), which specifies to which network resource the request is to be applied. A URI is either a Uniform Resource Locator ("URL") or Uniform Resource Name ("URN"), or any other formatted string that identifies a network resource. The URI contained in a request message, in effect, identifies the destination machine for a message. URLs, as an example of URIs, are discussed in detail in T. Berners-Lee, et al., *Uniform Resource Locators* (URL), RFC 1738, CERN, Xerox PARC, Univ. of Minn., December, 1994, which is incorporated herein by reference.

FIG. 1 illustrates how a browser application enables users to navigate among nodes on the WEB network by requesting and receiving WEB pages. For the purposes of this application, a WEB page is any type of document that abides by the HTML format. That is, the document includes an "<HTML>" statement. Thus, a WEB page is also be referred to as an HTML document. The HTML format is a document mark-up language, defined by the Hypertext Markup Language ("HTML") specification. HTML defines tags for specifying how to interpret the text and images stored in an HTML document. For example, there are HTML tags for defining paragraph formats and for emboldening and underlining text. In addition, the HTML format defines tags for adding images to documents and for formatting and aligning text with respect to images. HTML tags appear between angle brackets, for example, <HTML>. Further details of HTML are discussed in T. Berners-Lee and D. Connolly, *Hypertext Markup Language*-2.0, RFC 1866, MIT/W3C, November, 1995, which is incorporated herein by reference.

In FIG. 1, a WEB browser application 101 is shown executing on a client machine 102, which communicates with a server machine 103 by sending and receiving HTTP packets (messages). Web browser 101 "navigates" to new locations on the network to browse (display) what is available at these locations. In particular, when WEB browser 101 "navigates" to a new location, it requests a new document from the new location (e.g., server machine 103) by sending an HTTP-request message 104 using any well-known underlying communications wire protocol. HTTP-request message 104 follows the specific layout discussed above, which includes a header 105 and a URI field 106, which specifies the network location to which to apply the request. When the server machine specified by URI 106 (e.g., server machine 103) receives the HTTP-request message, it decomposes the message packet and constructs a return message packet to the source location that originated the message (e.g., client machine 102) in the form of an HTTP-response message 107. In addition to the standard features of an HTTP message, such as the header 108, the HTTP-response message 107 contains the requested HTML document 109. When the HTTP-response message 107 reaches the client machine 102, the WEB browser application 101 extracts the HTML document 109 from the message, and parses and interprets (executes) the HTML code in the document in order to display the document on a display screen of the client machine 102 as specified by the HTML tags.

To provide additional security in a global network environment, some WEB browser applications incorporate the use of an intermediary machine between the client machine and other machines on the WEB. For example, several client machines may be networked internally to a proxy server machine, which acts as a "firewall" between the client machines and server machines on an external network. FIG. 2 illustrates the use of a proxy server machine to send and receive HTTP documents. The WEB browser application 201, which is shown executing on a client machine 202, sends an HTTP-request message 205 to a server machine 203. The server machine (e.g., server machine 203) is specified by the URI field 206 contained in the HTTP-request message 205. However, in contrast to FIG. 1, the HTTP-request message 205 is sent first to a proxy server machine 204, which then forwards the HTTP-request message 205 as message 207 to the server machine 203. Because the proxy server machine 204 contains a separate external network connection to server machine 203, the client machine 202 is protected from ill-behaved applications, which may be executing on or accessible via server machine 203. For example, the proxy server machine may be specially programmed to detect viruses that may be sent in an HTTP-response message. When the HTTP-request message 207 is received, server machine 203 sends an HTTP-response message 208, which contains the requested HTML document 209, to the originator of the message. This time, the originator of the message is the proxy server 204. Thus, the HTTP-response message 208 is first sent to the proxy server machine 204 before the requested document is delivered to client machine 202. The proxy server machine 204, by having previously established a specific network connection for the original HTTP-request message 205 received from the client machine 202, knows that the received HTTP-response message 208 corresponds to the HTTP-request message 205 and thus forwards the HTTP-response message 208 as HTTP message 210 to the client machine 202. The WEB browser application 201 is then responsible for decomposing the HTTP-response message 210 to extract the HTML document and for executing the HTML code in the received document to properly display the document on client machine 202.

In network environments such as those shown in FIGS. 1 and 2, WEB browser applications, such as WEB browser 101, have attempted to make the navigational process easier for users by adding various "links" to places of interest.

These links can be used to navigate to a pre-specified location by simple maneuvers, such as clicking on a graphical button on a screen. A link in this context refers to a URI, which is used by the browser application to locate another document. For example, a WEB browser may provide graphical buttons, which are placed below the standard menus in toolbars. These buttons provide links that enable a user to easily navigate to specific locations defined by the developer of the WEB browser. In order to ensure that such links are present in every WEB page displayed, the browser application must include special code to display these graphical button user interface components. Thus, when a user invokes a different WEB browser application, the user may not have access to links to which the user has become accustomed.

SUMMARY OF THE INVENTION

The present invention provides a method and system for injecting code into an existing HTML document that enables the conditional generation and incorporation of injectable components by a browser application. The injection mechanism provided by the present invention enables a user to incorporate add-on components in a WEB page that is displayed by any browser application. These add-on components may provide an additional user interface capability to the browser application. Also, the injection mechanism is able to ensure that the add-on component is generated only under certain conditions, for example, when the component is not already being displayed by the browser application.

In one embodiment, the injection mechanism installs interceptor code as a proxy server to intercept HTTP messages between client code and server code. The interceptor code monitors HTTP messages sent from the client and is responsible for injecting code into HTML documents that are sent from servers to the client. The injected code, when executed by a client browser, conditionally inserts HTML code into the HTML document, which is then used by the browser to generate a new component, for example, a user interface component. In one embodiment, the user interface component is conditionally generated when the browser is not already displaying an instance of the component.

In another embodiment, the code supporting the injectable component is previously downloaded to a client machine. The injection mechanism provides a means for updating this downloaded code. According to one embodiment, the interceptor code is responsible for providing periodic updates to the code that supports the injectable component. In another embodiment, the code supporting the injectable component is downloaded whenever it is displayed.

The injection mechanism also provides the ability to inject code into both HTML documents that support HTML framesets and those that do not. HTML framesets enable a page author to specify a hierarchical organization of subpages within a page. When injecting code into an HTML document that contains an existing frameset, the interceptor code injects code that conditionally generates a new frameset tag statement, which surrounds the existing frameset. The new frameset, when generated, specifies a frame that contains sufficient information to generate an instance of the injectable component. In HTML documents that do not contain framesets or for browsers that do not support framesets, the interceptor code injects code into the body portion of the HTML document. This injected code conditionally inserts an additional HTML tag that is used by a browser to generate an object that corresponds to the injectable component. In one embodiment, the injected code inserted by the interceptor code is written in a script language, such as Javascript or VBscript.

As another aspect of the invention, the interceptor code installed as the proxy server is responsible for detecting whether the browser supports Active-X type objects, such as Microsoft's browser, or supports embedded plug-ins, such as Netscape's browser. The interceptor codes injects code that produces the correct component depending upon the browser mechanism.

DETAILED DESCRIPTION OF THE INVENTION

The present invention provides a method and system for transparently incorporating an injectable component, such as a user interface component, into an existing HTML document when the document is processed by a browser application (a "browser") that supports HTML. Specifically, the present invention provides an injection system that injects code into HTML documents. The injected code causes an instance of an injectable component to be transparently generated by the browser under certain conditions, for example, when an instance of the injectable component is not already being displayed. The browser transparently generates the new component by executing the injected code during its normal processing of HTML documents. Specifically, when the browser executes the injected code, HTML tags are conditionally inserted into the document. These tags then automatically cause the browser to generate the instance of the injectable component. In this manner, the decision as to whether to create the instance of the injectable component is delayed until the actual processing of the HTML document by the browser.

To accomplish these functions, the injection system of the present invention provides an injectable component, such as a user interface object, and interceptor code for injecting, into every HTML document, code that conditionally generates an instance of the injectable component. The injection system operates by installing the interceptor code as a new proxy server between the user's current browser and a proxy server, if one exists. If a proxy server has not been previously established by the user, then the interceptor code is installed between the current browser and the network. The interceptor code then monitors HTTP messages sent between the browser and the pre-existing proxy server (or a destination server) and injects code into each HTML document returned in an HTTP-response message intended for the browser. The injected code in each HTML document is then processed by the browser as described to conditionally generate an instance of the injectable component. Thus, the injection system enables a user to supplement the user's browser with the additional functionality of the injectable component, without modifying the browser, by intercepting HTTP messages and placing code in HTML documents that causes the additional behavior to appear.

Figure 3:
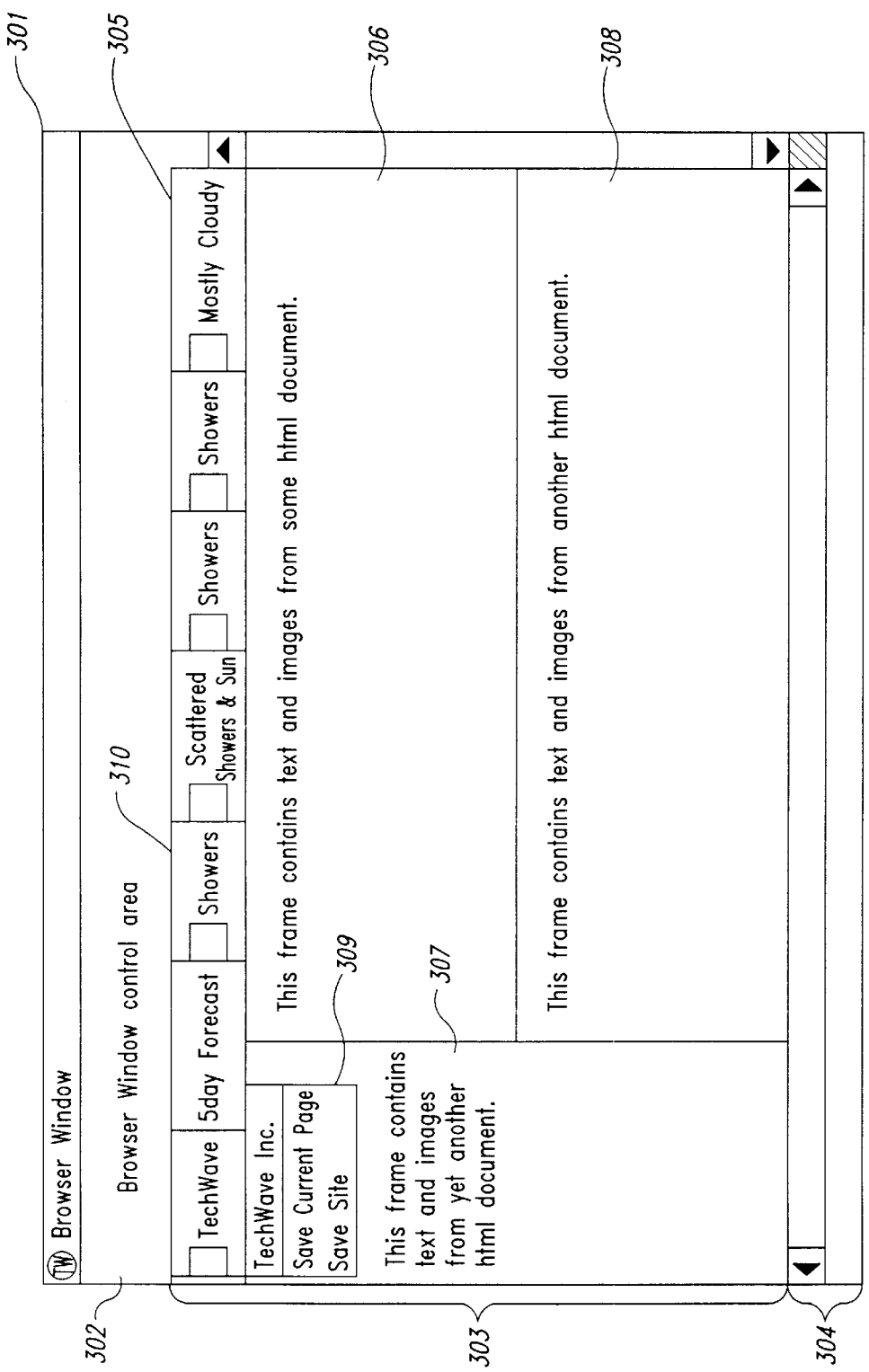
FIG. 3 is a block diagram illustrating an injectable component that has been incorporated into an existing HTML document without modifying the browser using the injection system of the present invention.

FIG. 3 is a block diagram illustrating an injectable component that has been incorporated into an existing HTML document without modifying the browser using the injection system of the present invention. Browser window 301 contains its own control areas, such as browser window control area 302 and scrollbar area 304, and an application window area 303, which is used to display HTML documents. The HTML document currently displayed in the application window 303 contains injected user interface component 305 and three pre-existing frames of the HTML document, frames 306, 307, and 308. The example injected user interface component 305 contains a drop-down menu 309 and several graphical buttons 310, which provide links to portions of a 5-day weather forecast. User interface component 305 enables a user to have near-immediate access to the 5-day weather forecast from all HTML documents that are displayed within the browser window 301. One skilled in the art will recognize that any contents can be displayed as the injectable component 305, providing the appropriate links and embedded objects can be created by the browser. Thus, the present invention is not limited to providing weather forecasts or static information but rather may be used to provide any kind of static or dynamic information, interface, or component.

The injection system of the present invention provides a technique for injecting a user interface component, such as the weather forecast bar shown in FIG. 3, each time an HTML document is newly loaded into the browser application window 303. Moreover, the injection system provides a technique for ensuring that only one instance of the injectable component is generated and displayed in the browser application window 303, regardless of which HTML document is loaded, in what order, or from what source.

Figure 1:
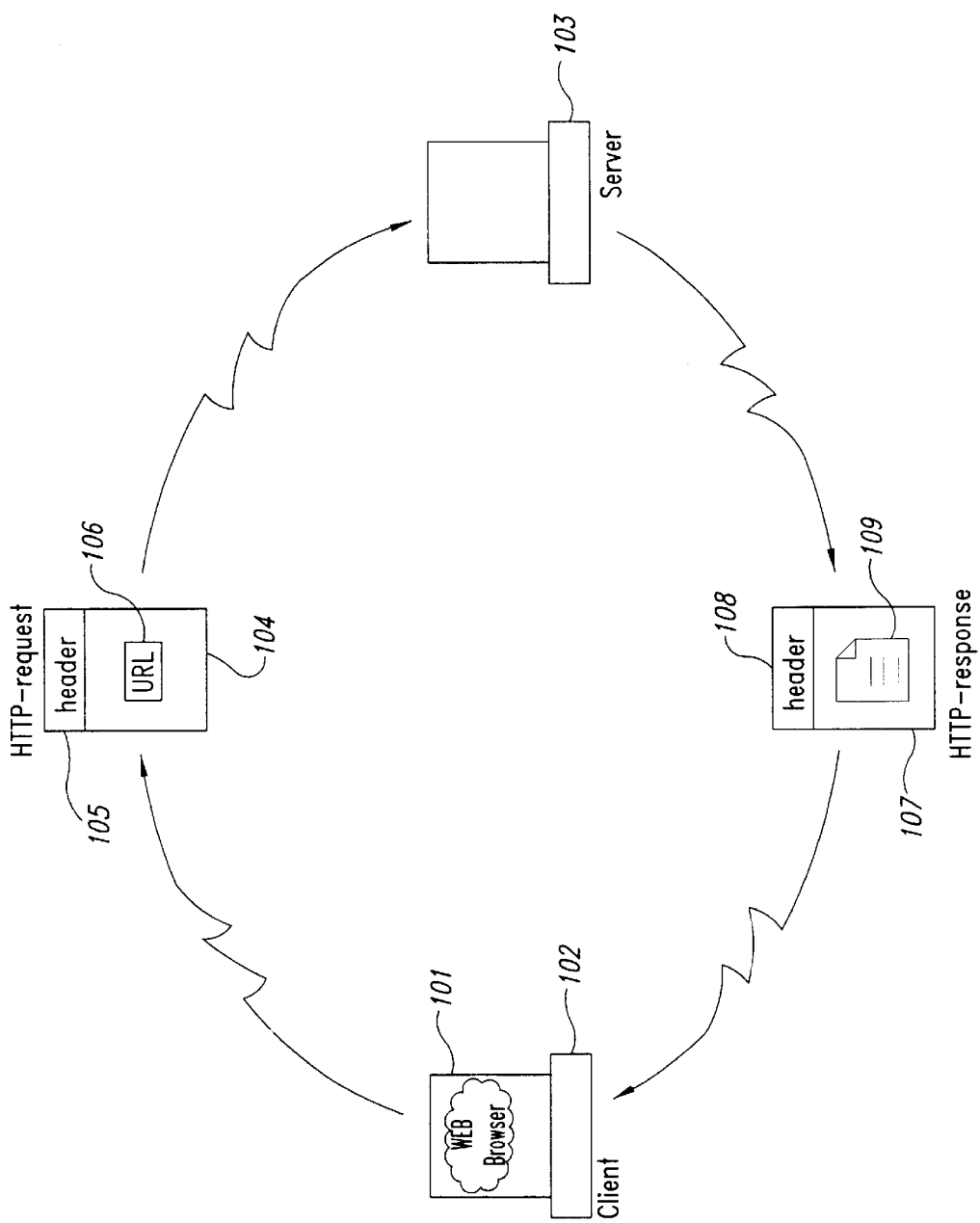
FIG. 1 illustrates how a browser application enables users to navigate among nodes on the WEB network by requesting and receiving WEB pages.
Figure 2:
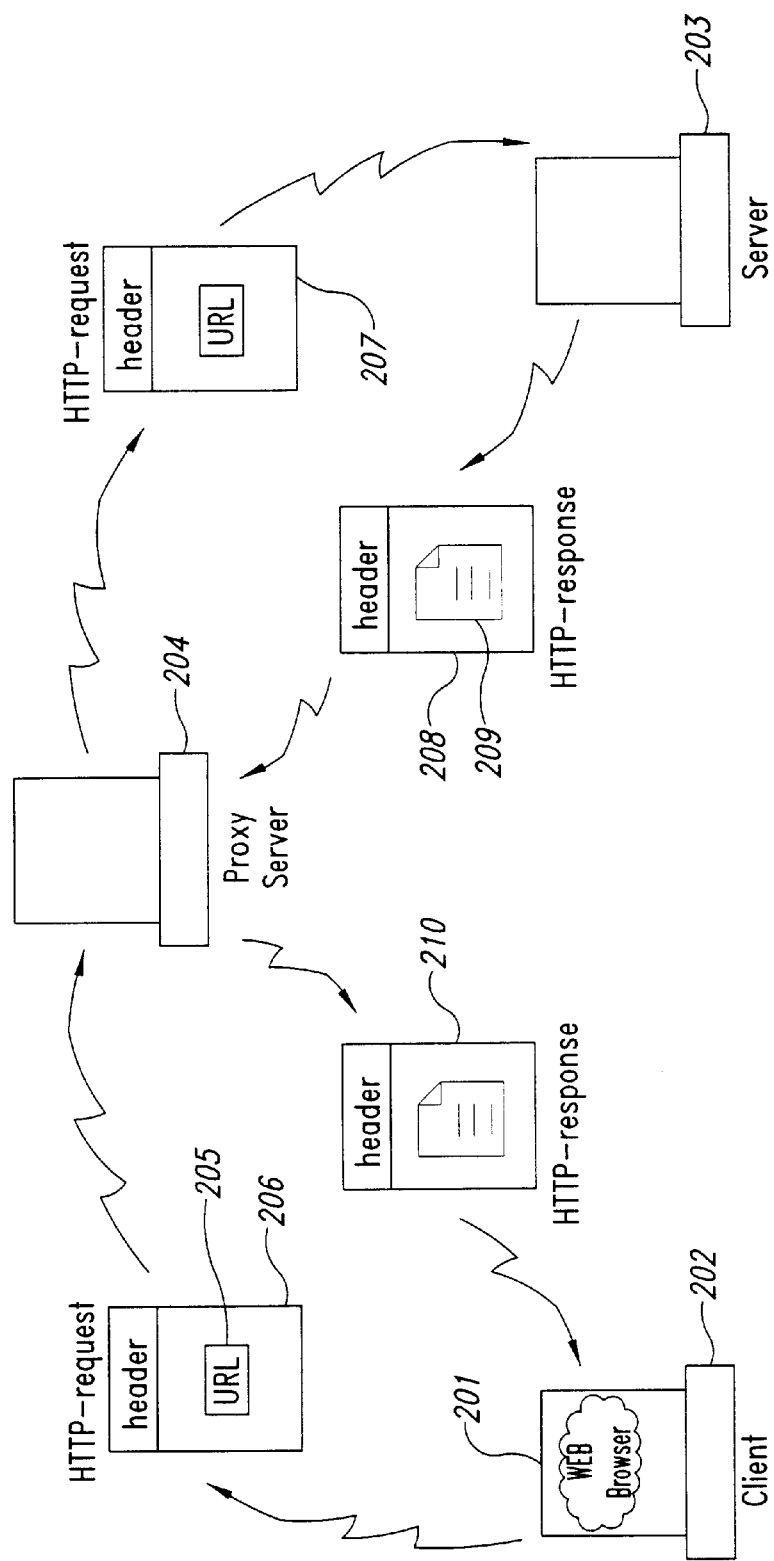
FIG. 2 illustrates the use of a proxy server machine to send and receive HTTP documents.
Figure 4:
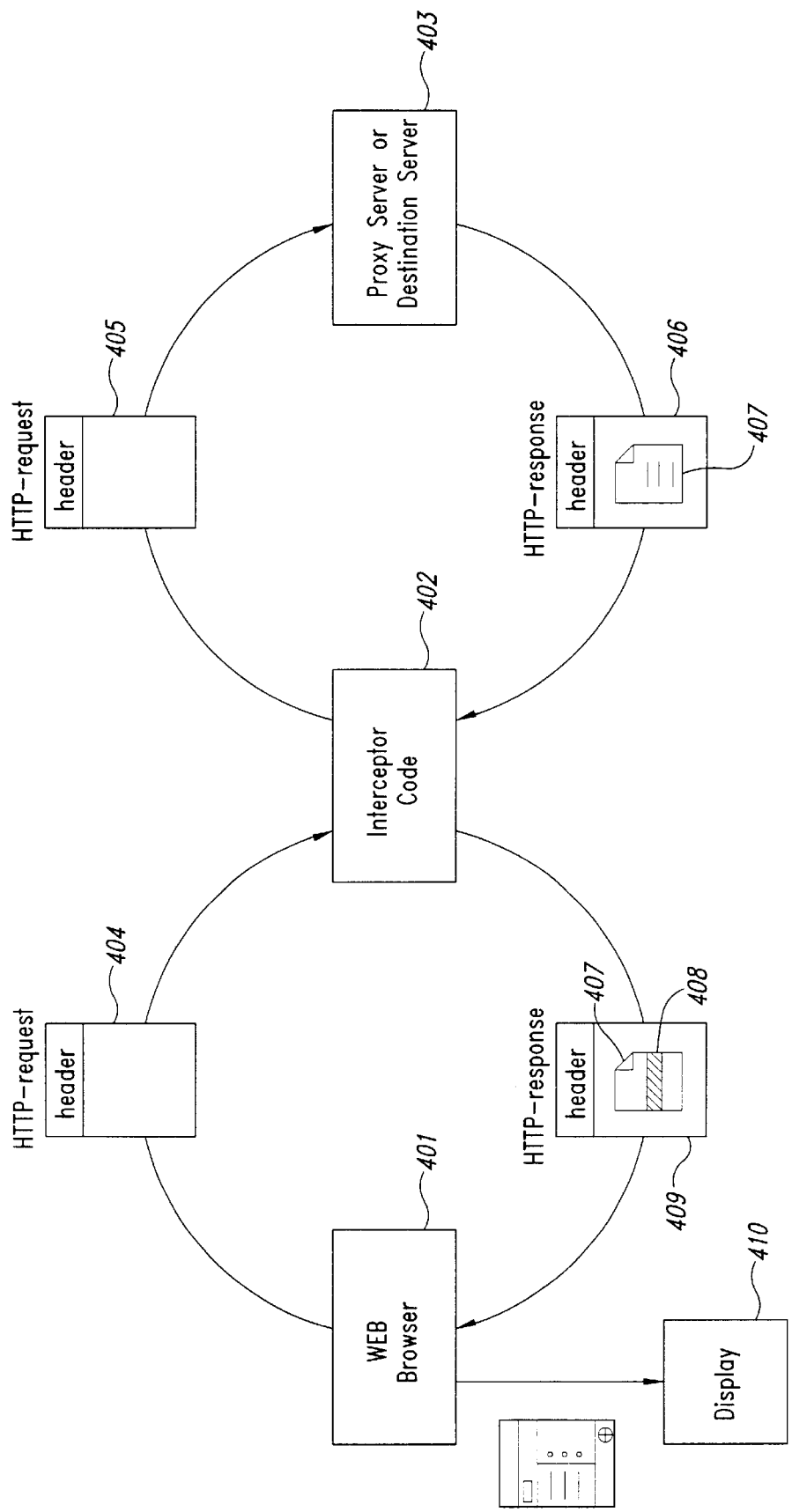
FIG. 4 provides an overview block diagram of the techniques used by the injection system of the present invention to modify the actions of a browser to include an injectable component.

FIG. 4 provides an overview block diagram of the techniques used by the injection system of the present invention to modify the actions of a browser to include an injectable component. Before the installation of the injection system, the WEB browser 401 sends and receives HTTP messages to a proxy server (or destination server) 403 as previously discussed with respect to FIGS. 1 and 2. As shown in FIG. 4, after the injection system of the present invention is installed, WEB browser 401 sends HTTP messages to and receives HTTP messages from an interceptor code module 402, which is installed as the current proxy server. Interceptor code module 402 is responsible for forwarding all HTTP requests and responses through the pre-existing proxy server if one existed prior to installation of the interceptor code module. As shown, WEB browser 401 sends an HTTP-request message 404 for an HTML document to interceptor code module 402, which forwards the request as an HTTP-request message 405 to the previously designated proxy server or a destination server 403. (Hereinafter these messages are simply referred to as HTTP-requests and HTTP-responses.) Once the destination server provides an HTTP-response corresponding to the HTTP-request, the HTTP-response is forwarded (through the pre-existing proxy server if designated) as HTTP-response message 406 to the interceptor code module 402. Once received, the interceptor code module 402 determines whether the HTTP-response includes an HTML document (e.g., document 407) and, if so, modifies the contents of the HTML document to inject code, shown as injected code 408. The injected code 408 is used later by the browser to conditionally generate an instance of the injectable component. Once the HTML document 407 is modified, the interceptor code module 402 returns the HTML document 407 with injected code 408 in an HTTP-response 409 to the WEB browser 401. The WEB browser 401 then decomposes the HTTP-response 409 to extract the HTML document 407 and executes any code present in the document 407 in order to display the document on display 410 as specified by the code. The code processed by the browser may include any browser supported code, such as scripts or HTML tag statements.

The injected code 408, which is injected into the HTTP-response 409 by interceptor code module 402, contains instructions that specifically cause the WEB browser 401 to conditionally insert HTML tag statements (HTML code) into the document 407 when the browser executes the injected code. The HTML code is used by the WEB browser 401 to generate and display an instance of the injectable component. The conditions are determined by the injected code itself. In one embodiment, the injected code is written to only insert these HTML tag statements when the component is not already being displayed. Thus, the injected code, when executed, detects when the specified condition is met. Then, when the specified condition is met, through its normal processing of the HTML code in the HTML document 407, the WEB browser 401 creates an instance of the component that is specified by the inserted HTML code. In one embodiment of the present invention, the inserted HTML code specifies an <OBJECT> tag, which defines an Active-X component for browsers that support Active-X components, such as the Microsoft Internet Explorer. Active-X components and the Microsoft Internet Explorer are defined in greater detail in J. O'Donnell et al., *Special Edition Using Microsoft Internet Explorer* 3, QUE Corp., 1996, which is incorporated herein by reference. In another embodiment, the inserted HTML code specifies an <EMBED> tag, which defines an embedded plug-in object for browsers that support embedded plug-ins, such as the Netscape browser. Embedded plug-ins and the Netscape browser are discussed in further detail in the S. Kronick, *Netscape Navigator Handbook*, Netscape Communications Corp., ed. Aug. 1, 1996, available on the Internet via http://home netscape.com/eng/mozilla/3.0/handbook/, which is incorporated herein by reference.

Thus, using the injection system of the present invention, one can conditionally modify any WEB page that abides by the HTML format to include an additional user interface component. For example, the injection system can be used to insert a specific set of menus supplied by a third party vendor into the user's current browser. Because the injection system techniques can ensure that an instance of the injectable component is only generated if it is not already displayed, the user will see only one set of these menus displayed no matter in what order the user navigates to the various WEB pages. As another example, the injectable component can specify a set of links to a weather forecast, such as those shown in FIG. 3.

Figure 5:
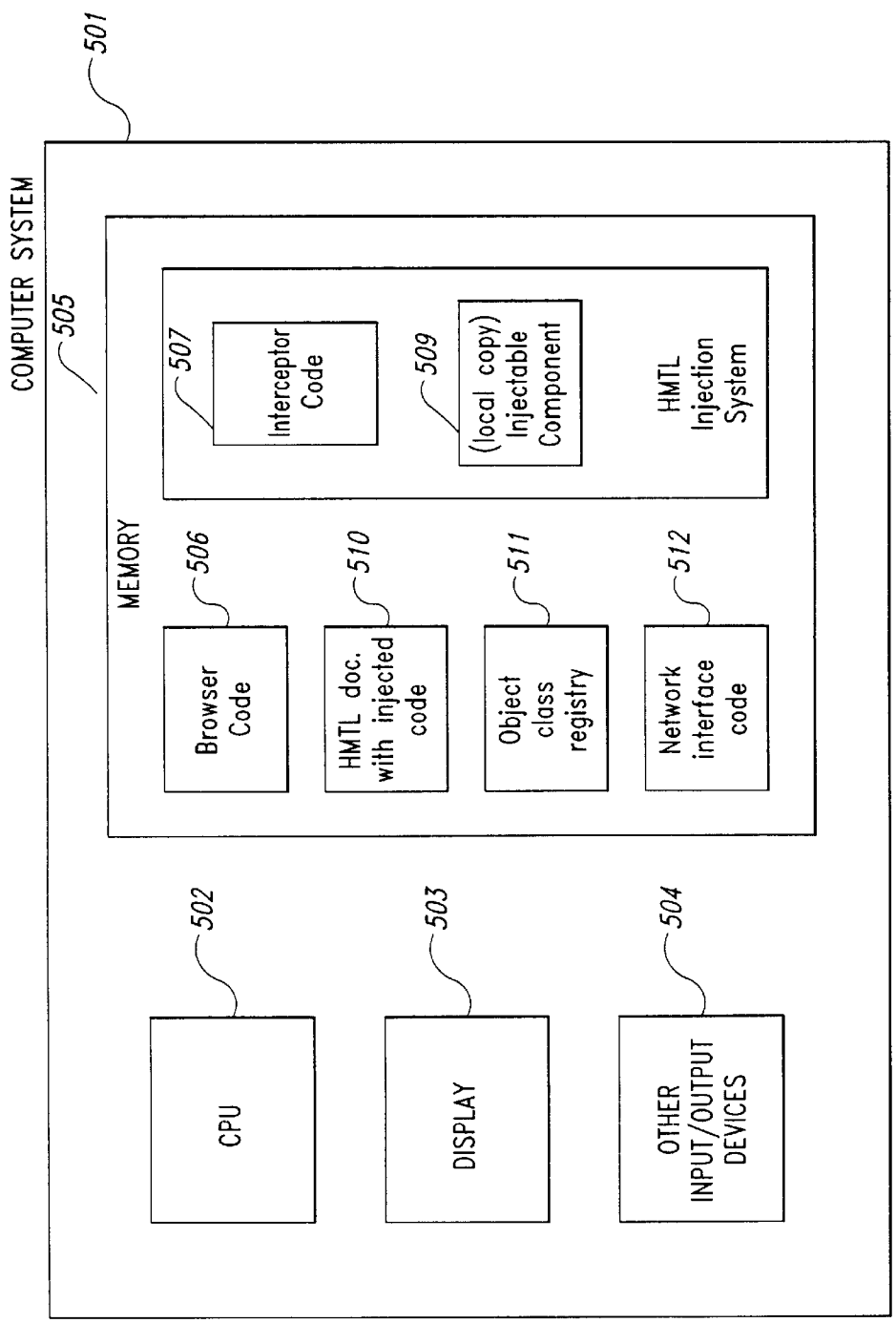
FIG. 5 is a block diagram of a general purpose computer system for practicing embodiments of the injection system.

In a preferred embodiment, the methods and systems of the injection system are implemented on a computer system comprising a central processing unit, a display, a memory, and other input/output devices. Preferred embodiments are designed to operate in a globally networked environment, such as a computer system that is connected to the Internet. FIG. 5 is a block diagram of a general purpose computer system for practicing embodiments of the injection system. The computer system 501 contains a central processing unit (CPU) 502, a display 503, a computer memory (memory) 505, or other computer-readable memory medium, and other input/output devices 504. The injection system 507 preferably resides in the memory 505 and executes on the CPU 502. The interceptor code 508 of the injection system 507 is shown with a local copy of the injectable component code 509 in the memory of the computer system after the injection system has been installed on the computer system 501. In addition, browser code 506 is also shown residing in the memory 505, along with an HTML document 510, after the injected code has already been injected; an object class registry 511, which is used to support communication with the injection system and to create objects; and the network interface code 512, which is used to interface with the network. Other programs not shown also reside in the memory 505. One skilled in the art will recognize that the preferred injection system can also be implemented in a distributed environment where the various programs shown as currently residing in the memory 505 are distributed among several computer systems. For example, the browser code 506 may reside on a different computer system from the interceptor code 508 and from the injectable component 509.

As discussed above, to be operable, the injection system of the present invention is installed as an intermediary between the user's current browser and any server with which the browser communicates. There are two ways the injection system is installed. First, a user may explicitly install the injection system by navigating to a predetermined location (an HTML document) on the network. Alternatively, the user may have received an HTML document from some other means, such as via an email message, which contains the injected code that is used to create an instance of the injectable user interface component. When the injected code is executed, the browser recognizes that it does not have the code that corresponds to the injectable component that is specified by the HTML tag definition and attempts to use a location that is designated by the HTML tag to download the needed code. The document downloaded from the designated location preferably corresponds to the predetermined location above, and the user is then given the option to install the injection system at that time just as if the user were explicitly installing the injection system. Once the injection system is installed, the interceptor code is installed as the current proxy and the injected code is then automatically inserted into each HTML document received by the browser.

Thus, in summary, the browser installs the injection system. Thereafter, each time the browser receives an HTML document, the browser executes the injected code inserted by the interceptor code and conditionally generates an instance of the specified injectable component by simply parsing and interpreting the HTML document using its normal mechanisms. FIGS. 6–14 describe the installation, injection, and execution techniques in more detail and illustrate sample code injected by the interceptor code module.

Figure 6:
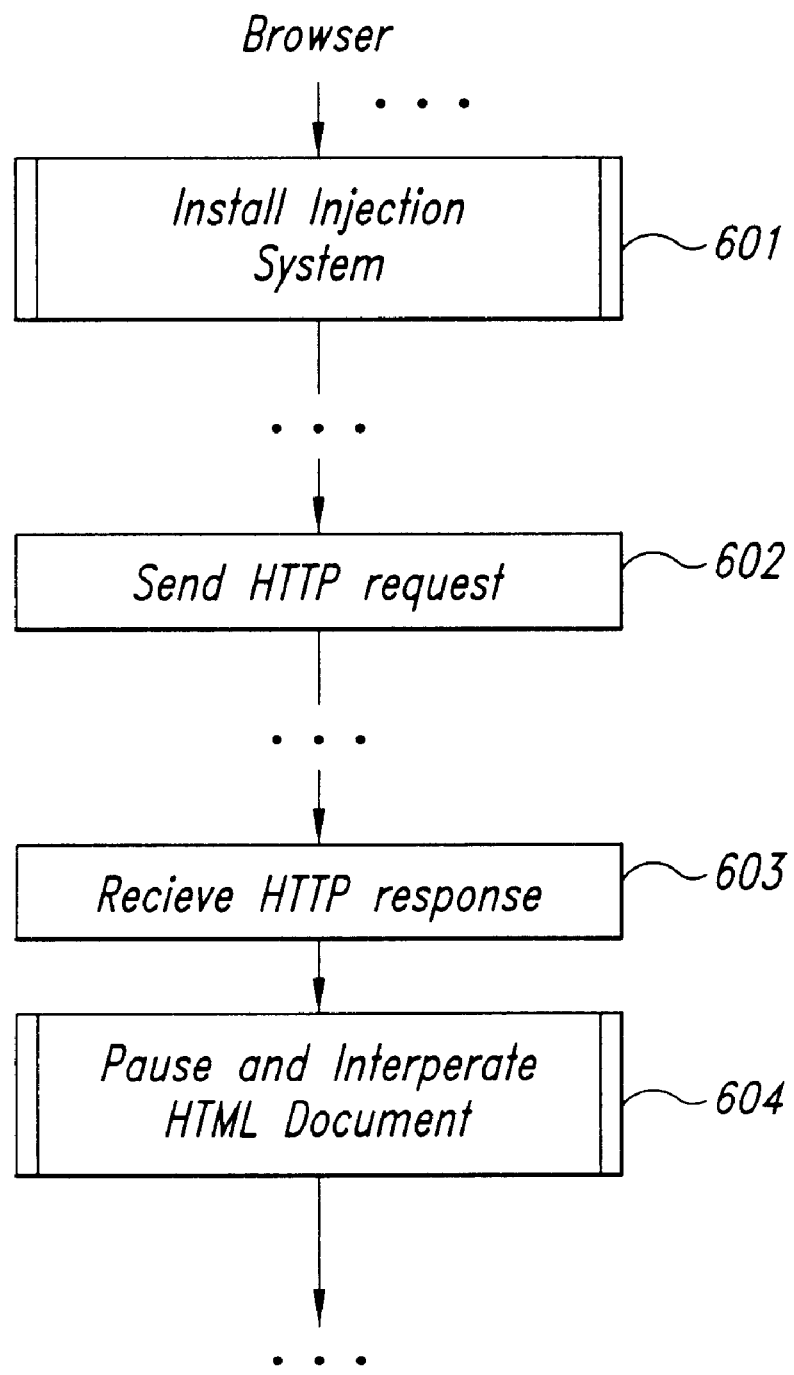
FIG. 6 is an overview flow diagram of the steps executed by a browser to install the injection system and to properly parse and interpret the HTML document such that the injectable component is conditionally generated.

FIG. 6 is an overview flow diagram of the steps executed by a browser to install the injection system and to properly parse and interpret the HTML document such that the injectable component is conditionally generated. Specifically, in step 601, the browser downloads an HTML document, which enables the user to install the injection system by executing an installation program. The steps performed by the installation program are described in detail with reference to FIG. 7. At some point during processing, in step 602, the browser sends an HTTP-request to a designated server. At some other point during processing, the browser receives a corresponding HTTP-response from the previously designated server, and in step 604, extracts, parses and interprets the HTML document contained within the HTTP-response in order to properly process the HTML document.

Figure 7:
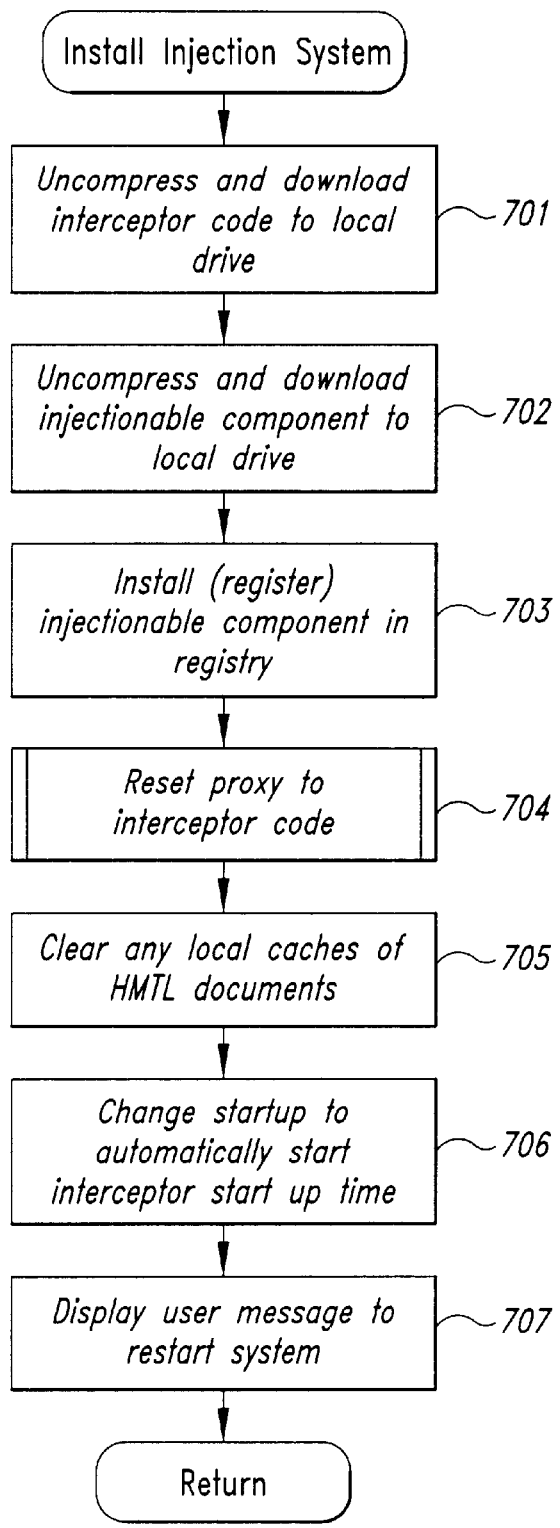
FIG. 7 is a flow diagram of the steps performed to install the injection system of the present invention.

FIG. 7 is a flow diagram of the steps performed to install the injection system of the present invention. These steps can be provided by a standard installation and set-up program, which provides a standard interface for installing files previously packaged by a vendor. To produce such a program, the vendor provides to an installation building program a set of files to be installed, designates where the files should be installed on the target machine, and provides various other parameters. The installation building program uses these files and the specified parameters to produce an installation program (such as "setup.exe"), which is then executed by an end user to install the files. Thus, the steps shown in FIG. 7 are the steps provided when the created installation program is actually executed by the user on the target machine. These steps are responsible for unloading the files provided by the vendor and for placing them in the proper locations on the target machine. In addition, the installation program for the injection system is responsible for installing the interceptor code as the new proxy server for the browser.

Specifically, in step 701, the install program uncompresses the file built by the supplier of the injection system and downloads the interceptor code module to local storage. In step 702, the install program uncompresses and downloads a copy of the code that implements the injectable component to local storage. One skilled in the art will recognize that this step may be eliminated if the code supporting the injectable component can be downloaded later when an instance of the component is generated. In step 703, the installation program installs the injectable component code into an object class registry, such as the object class registry 511 shown in FIG. 5. The object class registry provides a mechanism, given a CLASSID (class identifier)

of an object, to locate the appropriate code to load and execute in order to implement the object. For the purposes of the present invention, the object class registry provides a global data storage mechanism for storing information needed by the browser or by the interceptor code. One skilled in the art will recognize that other mechanisms that provide similar global storage functions could be substituted, for example, a standard database. In step 704, the installation code resets a browser property that indicates the current proxy server of the browser to indicate the newly downloaded interceptor code module. The steps for resetting the proxy server property are described in detail with reference to FIG. 8. In step 705, the installation program clears out any local copies of HTML documents. This step is performed to ensure that any HTML documents read by the browser after the injection system has been installed properly contain an instance of the injectable component. In step 706, the installation program changes the start-up procedure of the computer system to automatically begin executing the interceptor code module when the operating system is started, for example, at boot time. In step 707, the installation program displays a message to the user to restart the operating system to enable the newly designated proxy server (the interceptor code) to operate. The installation program then returns.

Figure 8:
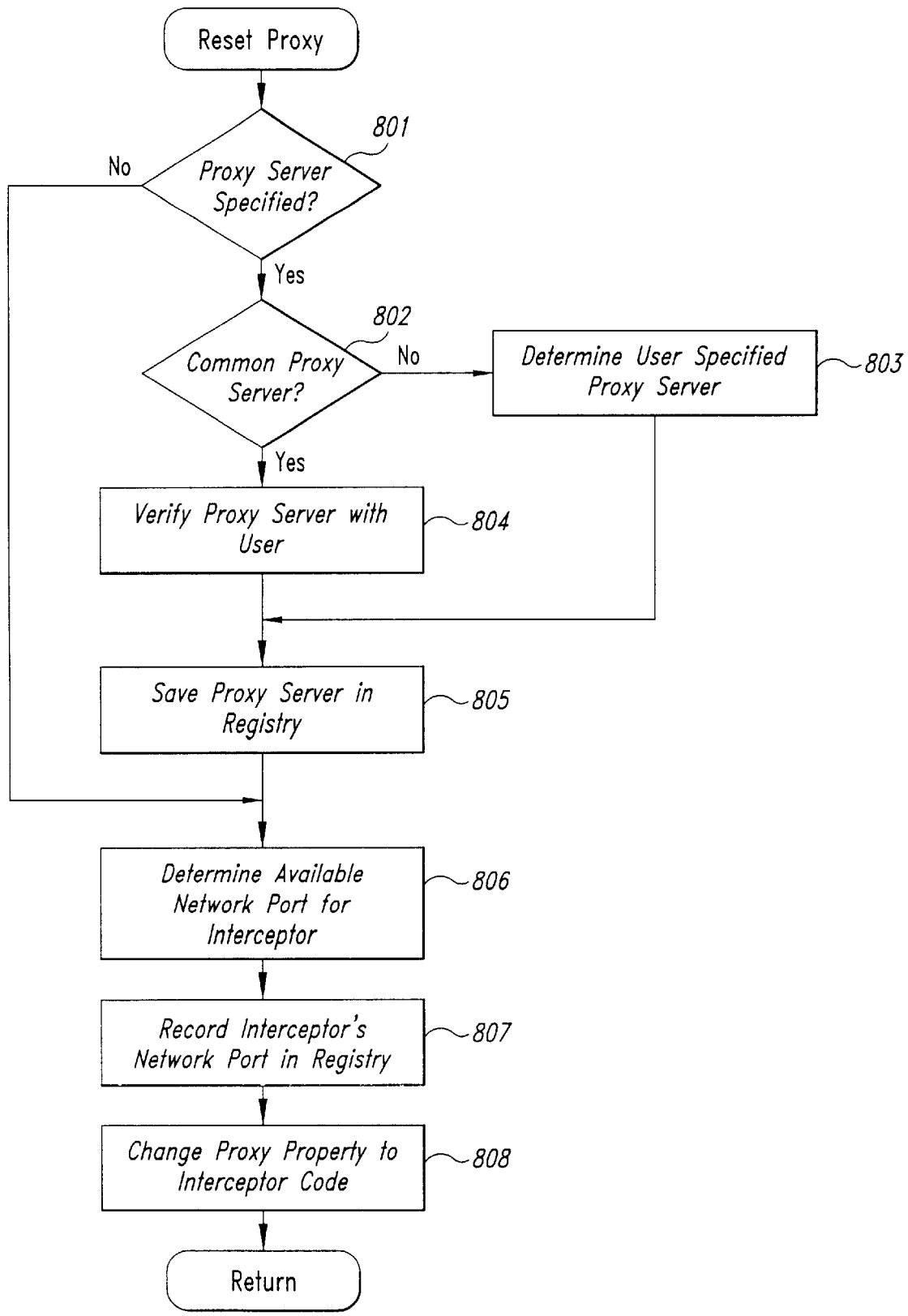
FIG. 8 is a flow diagram of the steps performed by an installation program to install interceptor code as a new proxy server.

FIG. 8 is a flow diagram of the steps performed by an installation program to install interceptor code as a new proxy server. Each browser implementation preferably provides a property for indicating the proxy server to be used to connect to the network, although any globally accessible indicator would be operable. Further, each such proxy server property is preferably stored in the class registry, although any storage mechanism accessible to the browser, the operating system, and the interceptor code would be operable. The installation code determines which proxy server property to modify based upon either the existence of a common proxy server designation or based upon a user designation. In particular, in step 801, the installation code determines whether any proxy servers have been specified for any browser and, if so, continues in step 802, else continues in step 806. In step 802, the installation code determines whether the proxy server properties for all of the available browsers designate the same proxy server and, if so, continues in step 804, else continues in step 803. In step 803, if different proxy servers have been designated by different browsers, then the installation code determines, preferably by prompting the user, which is the user's preferred (or default) browser, retrieves the proxy server property designation for that browser, and then continues in step 805. If, instead, a common proxy server has been specified for all of the available browsers, then in step 804, the installation code verifies that the user desires to use this proxy server and continues in step 805. In step 805, the installation code saves in the registry an indication of the proxy server designated by the determined proxy server property for later use by the interceptor code. In step 806, the installation code determines an available network port for the interceptor code to use to send and receive HTTP messages. One mechanism for performing this step is for the installation code to attempt to bind to a socket defined by the underlying communications protocol. When the installation code locates an available socket, then in step 807, the installation code records this socket address as a network port in the registry, so that the interceptor code can later retrieve this port from the registry. In step 808, the installation code changes the value indicated by the determined proxy server property to indicate the interceptor code, and then returns.

Figure 9:
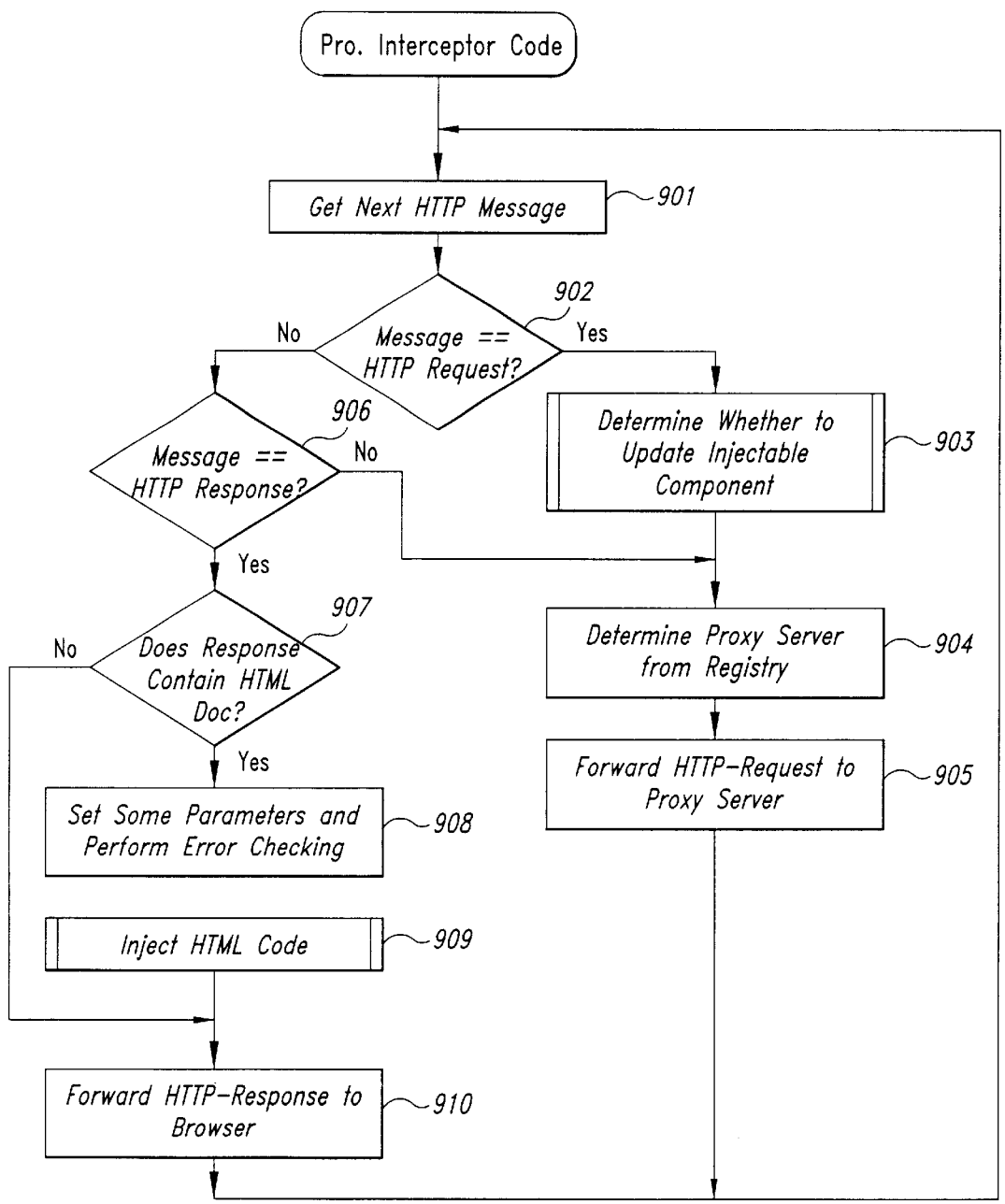
FIG. 9 is a flow diagram of the steps performed by the interceptor code to process HTTP messages.

Once installed, the interceptor code acting as a proxy server injects code that causes the conditional generation of an injectable component in each HTML document received by the interceptor code. FIG. 9 is a flow diagram of the steps performed by the interceptor code to process HTTP messages. These steps perform HTTP message forwarding for both HTTP-responses and HTTP-requests. When an HTTP-response is detected, code is injected into the HTML document and the response is forwarded to the browser. When an HTTP-request (from the browser) is detected, the interceptor code optionally determines whether to update the code that implements the injectable component and forwards the request to the appropriate server.

Specifically, in step 901, the interceptor code gets the next HTTP message from the network. In step 902, the interceptor code determines whether the message specifies an HTTP-request and, if so, continues in step 903, else continues in step 905. In step 903, the interceptor code determines whether to update the injectable component code that was previously downloaded to the local client machine. This step is discussed in detail with respect to FIG. 15. One skilled in the art will recognize that this step may be eliminated if the injectable component code is always downloaded by a browser at the time the code is needed. One skilled in the art will also recognize that this step can be performed at other times. In step 904, the interceptor code determines the previously saved proxy server designation from the registry. In step 905, the routine forwards the HTTP-request to the determined proxy server and returns to the beginning of the loop in step 901 to process additional HTTP messages. Note that the saved proxy server designation may indicate that no proxy server was in use. In that case, the HTTP-request is forwarded to the target server designated in the HTTP-request, whose location is specified by a URI contained in the request. In step 906, the interceptor code determines whether the packet is an HTTP-response and, if so, continues in step 907, else continues in step 904 to simply forward the request to the appropriate proxy server (if one exists). In step 907, the interceptor code determines whether the HTTP-response contains an HTML document and, if so, continues in step 908, else continues in step 910. In step 908, the interceptor code performs error checking and potentially determines various parameters needed to inject the code, for example, the type of browser that originated the corresponding HTTP-request. In step 909, the interceptor code injects code into the HTML document, the exact code being based upon the contents of the HTML document and the type of browser being used. In step 910, the interceptor code forwards the HTTP-response, with the injected code if injected, and returns to the beginning of the HTTP message processing loop in step 901.

The interceptor code acting as the proxy server injects different code into each received HTML document based upon several parameters. In particular, certain code is inserted when the HTML document contains a <FRAMESET> tag and other code is inserted when the HTML document contains a <BODY> tag. Also, different code is generated based upon the default scripting language specified in the HTML document and the type of dynamic objects that the target browser supports. The type of the target browser is indicated in the original HTTP-request to which the current HTTP-response being processed corresponds. The exact procedures for injecting HTML code based upon these parameters is discussed in greater detail with respect to FIG. 10. Further, examples of the injected code are discussed below in detail with reference to Tables 1–8.

Figure 10:
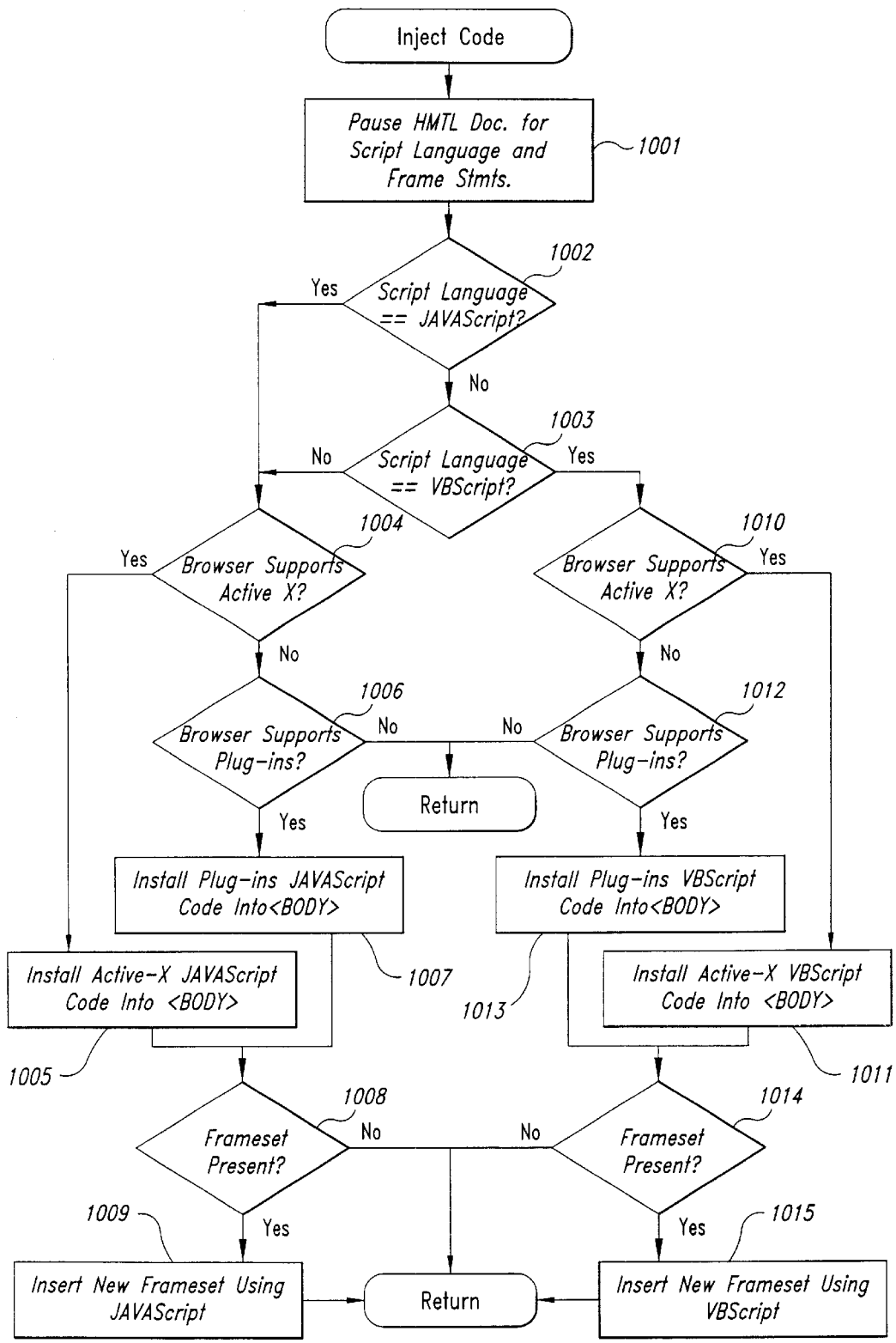
FIG. 10 is a flow diagram of the steps performed by the interceptor code to inject code into an HTML document.

FIG. 10 is a flow diagram of the steps performed by the interceptor code to inject code into an HTML document. As mentioned above, the interceptor determines the type of browser that has requested the HTML document and certain other features regarding the HTML document before it determines what code to inject into the HTML document. In particular, if the browser supports Active-X components, then the interceptor injects code that conditionally writes an Active-X component HTML statement into the HTML document when the browser parses and interprets the HTML document. Alternatively, if the browser supports embedded plug-ins, then the interceptor injects code that conditionally writes an embedded plug-in HTML statement into the HTML document. Also, if the HTML document includes a designation of a script language, then the injection routine retrieves the first such designation and injects code in the designated language. The first script language tag is preferably used because, according to convention, it determines the default script language for the rest of the document. If instead the interceptor code were to inject code written in a different script language than that specified by the first script language tag and were to insert this code (with a new script language tag) at the beginning of the HTML document, then potentially scripts originally present in the HTML document would not work properly because they may be parsed according to a different language. Also, certain code is inserted when a <FRAMESET> tag is present in the HTML document and other code is inserted when a <BODY> tag is present in the HTML document. One skilled in the art will recognize that other parameters may be accounted for by the code and that the code could contain statements other than those reflected in the examples below.

Specifically, in step 1001, the interceptor code parses the HTML document to determine the first (if any) script language specified and whether there are any <FRAMESET> tags present. In step 1002, the interceptor code determines whether the first script language tag indicates that Javascript is the default script language and, if so, continues in step 1004, else continues in step 1003. In step 1003, if the default script language is VBscript, then the interceptor continues in step 1010 to insert a script in the VBscript language, else continues in step 1004 to insert a script written in the Javascript language. One skilled in the art will recognize that any scripting language can be detected and code accordingly provided as long as the interceptor code is written to inject the appropriate code into the HTML document. In step 1004, the interceptor determines whether the browser supports Active-X components, such as the MICROSOFT INTERNET EXPLORER, and, if so, continues in step 1005, else continues in step 1006. In step 1005, the interceptor injects code written in Javascript which conditionally inserts an HTML tag that specifies an Active-X component, after the first <BODY> tag found in the HTML document, and continues in step 1008.

Table 1 provides example code for the code injected at step 1005.

```
<SCRIPT LANGUAGE="JavaScript">
<!--
   if(top.frames.length<2)
   {
      document.write("<OBJECT
         ID=\"CaptureX1\"WIDTH=\"100%\"
         HEIGHT=23")
      document.write("CODEBASE=\"http://
         www.techwave.com/WebCapture/
         CaptureX.cab#Version=1,0,0,2\"")
      document.writeln("CLASSID=
         \"CLSID:DF4ED563-7875-1140-8DA7-
         00400522111D\">")
      document.write("<PARAM   NAME=
         \"DocumentURL\"VALUE=\"http://
         server/path\"></OBJECT>")
   }
//-->
</SCRIPT>
```

Table 1

This code in essence tests to see whether there is only one frame present and, if so, generates an <OBJECT> tag. This code is discussed in further detail in FIG. 14, which describes how a browser interprets this injected code.

Alternatively, in step 1006 the interceptor code determines whether the browser supports embedded plug-in modules and, if so, continues in step 1007, else returns. In step 1007, the interceptor code injects code written in Javascript, which conditionally inserts an HTML tag that specifies an embedded plug-in, after the first <BODY> tag found in the HTML document, and continues in step 1008.

Table 2 provides example code for the code injected into the HTML document in step 1007.

```
<SCRIPT LANGUAGE="JavaScript">
<!--
   if(top.frames.length<2)
   {
      document.write("<EMBED TYPE=\"application/x-
         webcapture\"")
      document.write("WIDTH=\"100%\"HEIGHT=23")
      document.writeln("PLUGINSPACE=\"http://
         www.techwave.com/
         WebCapture\">")
      document.write("<PARAM   NAME=
         \"DocumentURL\"
         VALUE=\"http://server/path\"></EMBED>")
   }
//-->
</SCRIPT>
```

Table 2

This code in essence tests to see whether there is only one frame present and, if so, generates an <EMBED> tag. This code is discussed in further detail with respect to FIG. 13, which describes how a browser interprets this code.

Table 3 provides an overall example of what an HTML document that includes a <BODY> tag definition looks like after code written in Javascript is injected when the default language specified is Javascript and the target browser supports Active-X components. In Table 3, the injected code beginning with the <SCRIPT LANGUAGE . . . > tag and ending with the </SCRIPT> tag is inserted after the first <BODY> tag statement located in the HTML document.

```
<html>
<BODY>
<SCRIPT LANGUAGE="JavaScript">
<!--
   if(top.frames.length<2)
   {
      document.write("<OBJECT
         ID=\"CaptureX1\"WIDTH=\"100%\"
         HEIGHT=23")
      document.write("CODEBASE=\"http://
         www.techwave.com/WebCapture/
         CaptureX.cab#Version=1,0,0,2\"")
      document.writeln("CLASSID=
         \"CLSID:DF4ED563-7875-1140-8DA7-
```

```
        00400522111D\">")
      document.write("<PARAM       NAME=
        \"DocumentURL\"
        VALUE=\"http://server/path\"></OBJECT>")
    }
  //→
  </SCRIPT>
  <SCRIPT . . . >
    . . . Script already on page . . .
  </SCRIPT>
  <BODY . . . >
  </html>
```

Table 3

In step 1008, the interceptor code determines whether there is a <FRAMESET> tag present in the HTML document and, if so, continues in step 1009, else returns. In step 1009, the interceptor code injects code written in Javascript, which conditionally inserts a new <FRAMESET> tag definition around the first located <FRAMESET> tag definition, and then returns. For convenience, a closing </FRAMESET> tag is preferably always injected into the HTML document. This ending tag is typically ignored by a browser if <FRAMESET> tags are not present in the document. Otherwise, the appropriate closing </FRAMESET> tag is inserted in an appropriate location in the HTML document.

Table 4 provides example code for the code injected into the HTML document in step 1009.

```
  <SCRIPT LANGUAGE="JavaScript">
  <!—
    if(top.frame.length<2)
    {
      document.write("<FRAMESET rows=25,*
        FRAMEBODER=0
        FRAMESPACING=0 BORDER=0>")
      document.write("<FRAME MARGINWIDTH=0
        MARGINHEIGHT=0
        NORESIZE SCROLLING=\"No\"
        SRC=\"FramePage.htm\">")
    }
  //→
  </SCRIPT>
```

Table 4

In essence, the code tests to see whether there is only one frame present and, if so, generates a new frameset that points to the appropriate injectable component tag definition.

Table 5 provides an overall example of what an HTML document that contains a <FRAMESET> tag definition looks like after code is injected, when the default language specified is Javascript or no language was specified. This table contains the same code as Table 4, except that the injected code is shown in context. The injected code begins with the <SCRIPT LANGUAGE> tag and ends with the </SCRIPT> tag. Each frameset defines one or more frames and specifies a source document to be used to fill the frames. Note that the URL that is specified for the source document of the frame in this case points to the appropriate code, as shown in Table 1 or 2, depending upon whether the browser supports Active-X components or embedded plug-ins.

```
  <html>
  <SCRIPT LANGUAGE="JavaScript">
  <!—
    if(top.frames.length<2)
    {
      document.write "<FRAMESET rows=25,*
        FRAMEBODER=0
        FRAMESPACING=0 BORDER=0>"
      document.write "<FRAME MARGINWIDTH=0
        MARGINHEIGHT=0
        NORESIZE SCROLLING=""No""SRC=
          ""FramePage.htm"">"
  //→
  </SCRIPT>
  <FRAMESET . . . >
    <FRAME . . . >
    </FRAME>
  </FRAMESET>
  </html>
```

Table 5

Returning to step 1003, if the interceptor code determines that the default language specified is VBscript, then the routine continues in step 1010. Steps 1010–1015 operate analogously to steps 1004–1009, except that they insert code written in VBscript instead of Javascript.

Table 6 provides example code for the code injected into the HTML document in step 1011. This code conditionally inserts an Active-X component HTML statement into the HTML document when the browser parses and interprets the HTML document.

```
  <SCRIPT LANGUAGE="VBScript">
  <!—
    if(top.frames.length<2)then
      document.write         "<OBJECT
        ID=""CaptureX1""WIDTH=""100%""
        HEIGHT=23"
      document.write "CODEBASE=""http://
        www.techwave.com/
        WebCapture/CaptureX.cab#Version=1,0,0,2""")
      document.writeln       "CLASSID=
        ""CLSID:DF4ED563-7875-1140-8DA7-
        00400522111D"">"
      document.write "<PARAM        NAME=
        ""DocumentURL""
        VALUE=""http://server/path""></OBJECT>"
    end if
  REM→
  </SCRIPT>
```

Table 6

Table 7 provides example code for the code injected into the HTML document in step 1013. This code conditionally inserts an embedded plug-in HTML statement into the HTML document when the browser parses and interprets the HTML document.

```
  <SCRIPT LANGUAGE="VBScript">
  <!—
    if(top.frames.length<2)then
      document.write "<EMBED TYPE=""application/x-
        webcapture"""
      document.write "WIDTH=""100%""HEIGHT=23"
      document.writeln "PLUGINSPACE=""http://
        www.techwave.com/
        WebCapture""<
      document.write        "<PARAM      NAME=
        ""DocumentURL""
```

VALUE=""http://server/path""></EMBED>"
  end if
REM→
</SCRIPT>

Table 7

Table 8 provides example code for the code injected into the HTML document in step 1015, when a <FRAMESET> tag is present.

<SCRIPT LANGUAGE="VBScript">
  if(top.frames.length<2)then
    document.write "<FRAMESET rows=25,*
      FRAMEBODER=0
      FRAMESPACING=0 BORDER=0>"
    document.write "<FRAME MARGINWIDTH=0
      MARGINHEIGHT=0
      NORESIZE SCROLLING=""No""
      SRC=""FramePage.htm"">"
  end if
</SCRIPT>

Table 8

Figure 11:
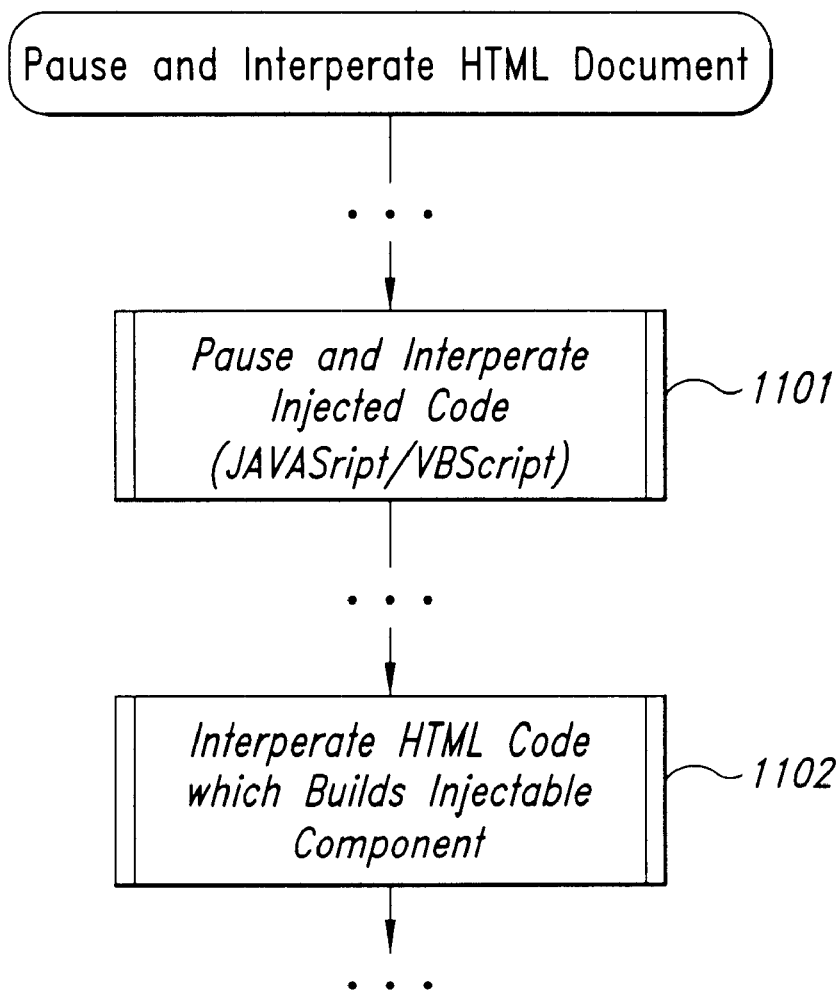
FIG. 11 is an overview flow diagram of the steps performed by a browser to parse and interpret an HTML document.

FIG. 11 is an overview flow diagram of the steps performed by a browser to parse and interpret an HTML document. These steps correspond to step 604 in FIG. 6. In step 1101, the browser parses and interprets the HTML document. When it parses and interprets the code injected by the interceptor code, it conditionally writes the appropriate HTML tags into the HTML document. The details of this step are discussed further with reference to FIG. 12. In step 1102, assuming that additional HTML code is written into the document, the browser interprets this HTML code to build an instance of the injectable component. The details of this step are disclosed further with reference to FIGS. 13 and 14.

Figure 12:
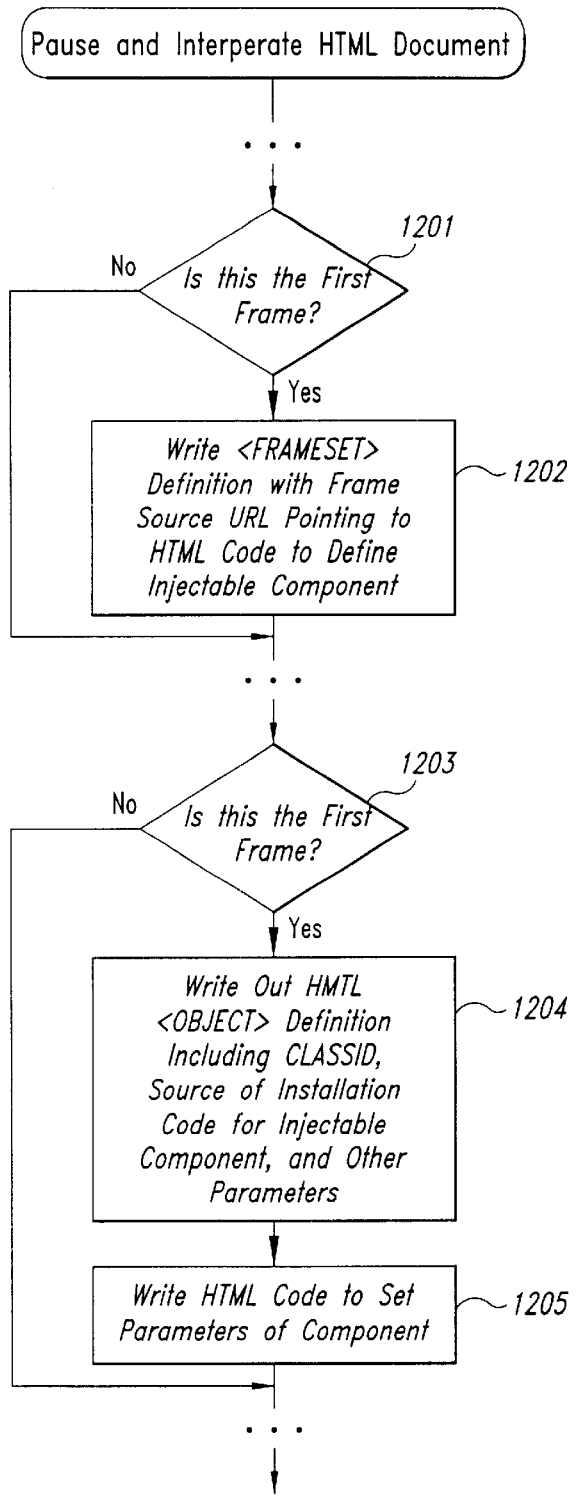
FIG. 12 is a flow diagram of the steps performed by a browser to parse and interpret the injected code inserted by the interceptor code module.

FIG. 12 is a flow diagram of the steps performed by a browser to parse and interpret the injected code inserted by the interceptor code module. Although the specific steps illustrated in FIG. 12 correspond to a browser that supports Active-X components when the injected code is written in Javascript, analogous steps are performed for a browser that supports plug-ins or when the injected code is written in VBscript. Exceptions are noted below. In FIG. 12, the browser preferably determines whether an instance of the injectable component is already being displayed and, if so, does nothing. Otherwise, if designated by the injected code, a new <FRAMESET> tag definition is inserted into the HTML document and a new <OBJECT> tag definition is inserted into the HTML document.

Specifically, in step 1201, when the browser executes the injected code placed before an existing <FRAMESET> tag (see, e.g., Table 4), then the browser determines whether an instance of the injectable component is already being displayed. If so, the browser ignores the injected code, otherwise continues in step 1202. In step 1202, assuming the HTML document contains injected code as shown in Table 5, then the "document.write" statements are executed. These statements generate a new <FRAMESET> definition with a frame source URL pointing to HTML code that is used to generate an instance of the injectable component (e.g., the tags shown in either Table 1 or Table 2). In step 1203, when the browser executes the injected code placed after the <BODY> tag (see, e.g., Table 3) then the browser determines whether an instance of the injectable component is already being displayed. If so, then the browser ignores the injected code, otherwise continues in step 1204. In step 1204, the browser executes the "document.write" statements shown, for example, in Table 1, to insert a new HTML <OBJECT> tag definition into the HTML document. The <OBJECT> tag definition includes a CLASSID, the source of installation code for the injectable component, and various other parameters. Note that, if the steps of FIG. 12 are instead executed for a browser that supports plug-ins, then the "document.write" statements will instead generate an <EMBED> tag, such as shown in the "document.write" statements of Table 2. In step 1205, the browser optionally writes out any other needed HTML code to set parameters of the instance of the injectable component, and continues.

Figure 13:
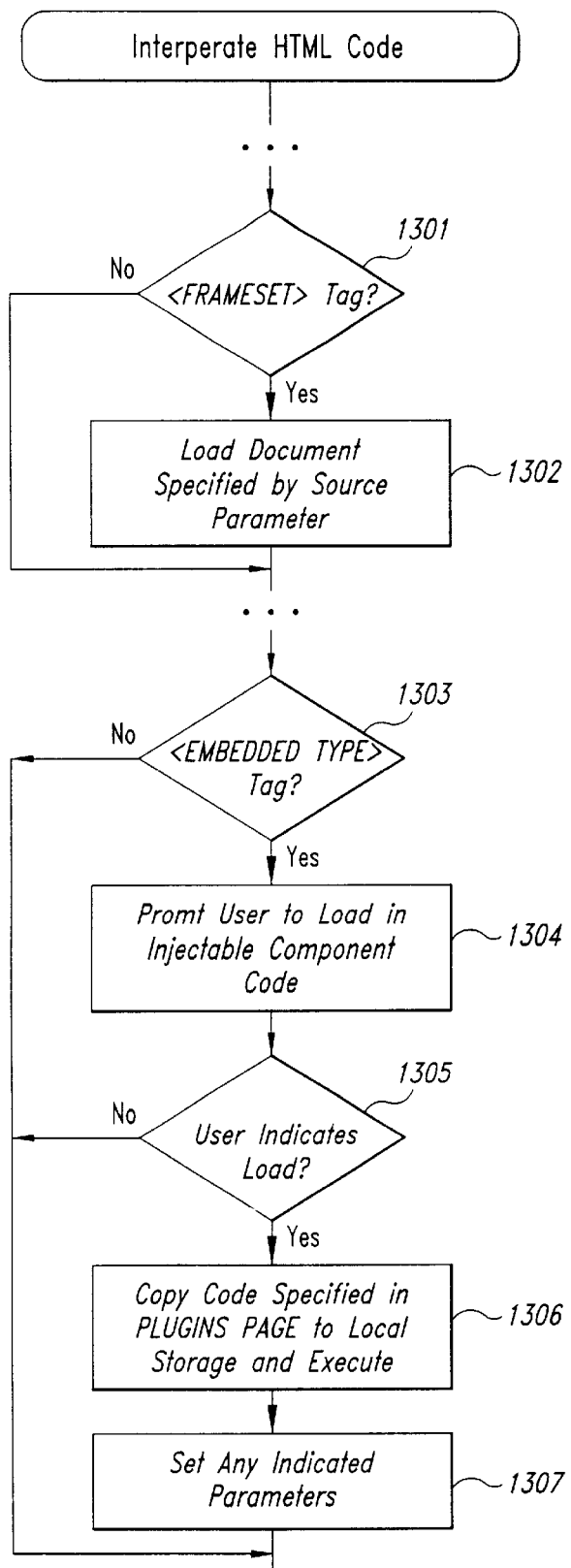
FIG. 13 is a flow diagram of the steps performed by a browser that supports plug-ins when processing HTML tags.
Figure 14:
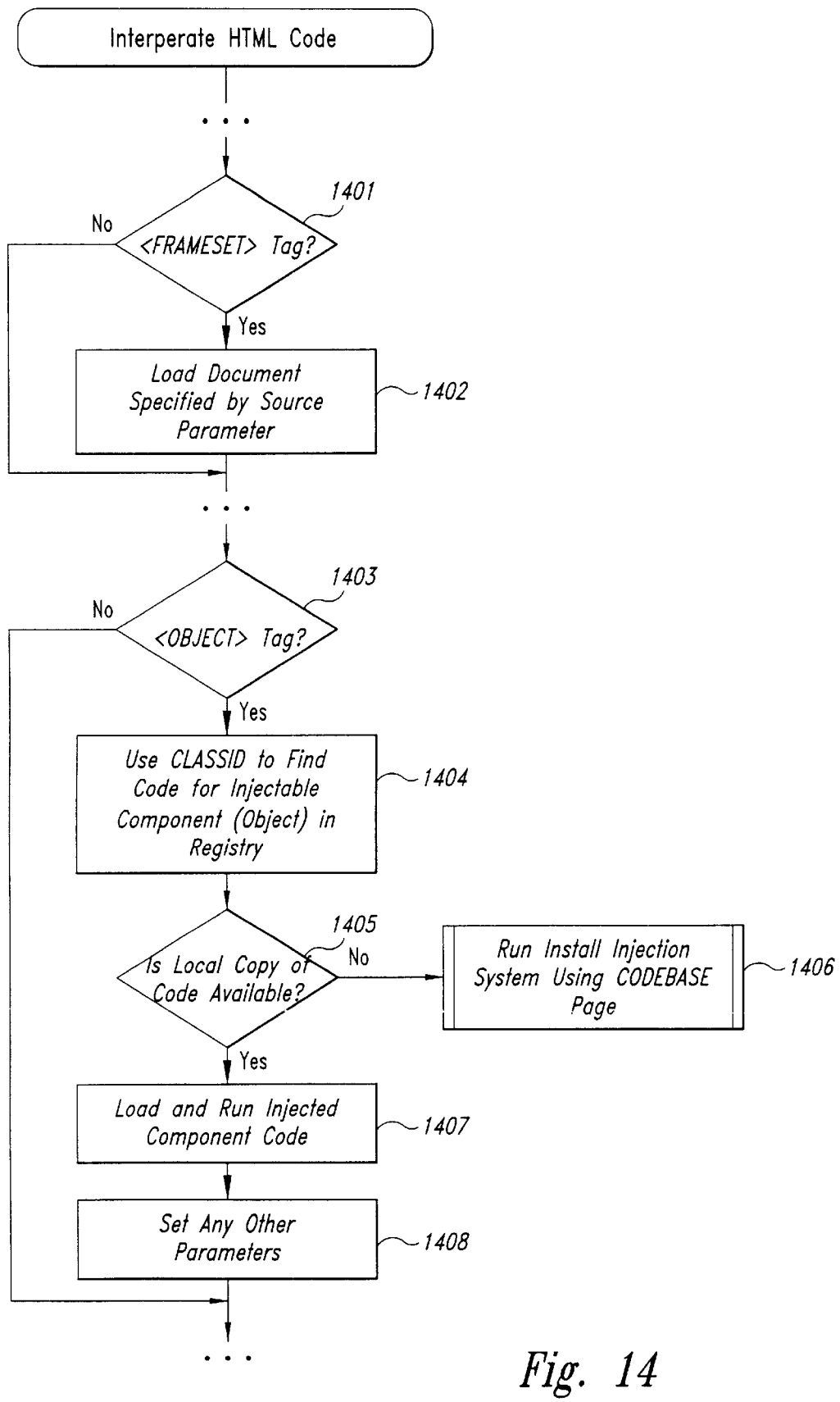
FIG. 14 is a flow diagram of the steps performed by a browser that supports Active-X components when processing HTML tags.

FIGS. 13 and 14 discuss the steps performed by a browser to parse and interpret the inserted HTML tags to generate an instance of an injectable component. These tags are inserted into the HTML document as a result of executing the injected code, which was previously inserted by the interceptor code module. These routines correspond to step 1102 in FIG. 11 for a browser that supports embedded plug-in modules and for a browser that supports Active-X components, respectively.

FIG. 13 is a flow diagram of the steps performed by a browser that supports plug-ins when processing HTML tags. In step 1301, if the browser detects a <FRAMESET> tag definition, then it continues in step 1302, else continues to process other types of HTML tags. In step 1302, the browser loads the HTML document specified by the source parameter URL of the <FRAMESET> tag and continues. In this case, the source parameter specifies a document that contains an <EMBED> tag, analogous to the <EMBED> tag generated by the "document.write" statements shown in Table 2. In step 1303, when the browser detects an <EMBED> HTML tag, it continues in step 1304, else continues to process other HTML tag definitions. In step 1304, the browser prompts the user to load in the code for the injectable component. In step 1305, if the user indicates a desire to load the embedded object, then the browser continues in step 1306, else continues with other processing. In step 1306, the browser copies to local storage the code specified by the "PLUGINSPAGE" parameter and executes the code in order to generate the embedded component. In step 1307, the browser sets any other parameters indicated by the <EMBED> tag definition and continues with other processing. As demonstrated in FIG. 13, the HTML tags conditionally generated by the injected code are processed just as all other HTML codes in the HTML document. Thus, the process of inserting an injectable component into the browser using the injection system of the present invention is transparent to the browser.

FIG. 14 is a flow diagram of the steps performed by a browser that supports Active-X components when processing HTML tags. In step 1401, if the browser detects a <FRAMESET> tag definition, then it continues in step 1402, else continues to process other types of HTML tags. In step 1402, the browser loads the HTML document specified by the source parameter URL of the <FRAMESET> tag and continues. In this case, the source parameter specifies a document that contains an <OBJECT> tag, analogous to the <OBJECT> tags generated by the "document.write" statements shown in Table 1. In step 1403, when the browser detects an <OBJECT> tag definition, the browser continues in step 1404, else continues with the processing of other HTML tag definitions. In step 1404, the browser uses the CLASSID specified in the <OBJECT> tag definition as a parameter to locate the executable code for the injectable component in the class registry. In step 1405, the browser determines whether a local copy of the code designated in the registry is available and, if so, continues in step 1407, else continues in step 1406. In step 1406, when the code is unavailable the browser runs the install injection system using the document specified by the CODEBASE parameter of the <OBJECT> tag to perform the steps discussed with reference to FIG. 7. As described earlier, step 1406 is typically executed when a user receives an HTML document that contains injected code but when the injection system of the present invention has not yet been installed. Details for how downloading is performed using a cabinet file (a file with a ".cab" extension) are provided in D. Chappell, *Understanding Active-X and OLE*, Microsoft Press, Redmond, 1996, which is incorporated herein by reference. In summary, the cabinet file is automatically deconstructed to yield a file (a ".INF" file) that directs the installation process. In step 1407, when a local copy of the injectable component code is available, the browser loads and runs the injectable component code. In step 1408, the routine sets any other parameters for the injectable component that are indicated by the <OBJECT> tag, and continues with other processing.

As described with reference to FIG. 9 in discussing the steps performed by the interceptor code, in one embodiment, the interceptor code is responsible for updating the code that implements the injectable component. This procedure may be important, for example, when a local copy of the injectable component code is stored on the client machine. Recall that the interceptor code preferably determines whether this update is needed each time it receives an HTTP message that contains an HTTP-request (see, e.g., step 903 in FIG. 9).

Figure 15:
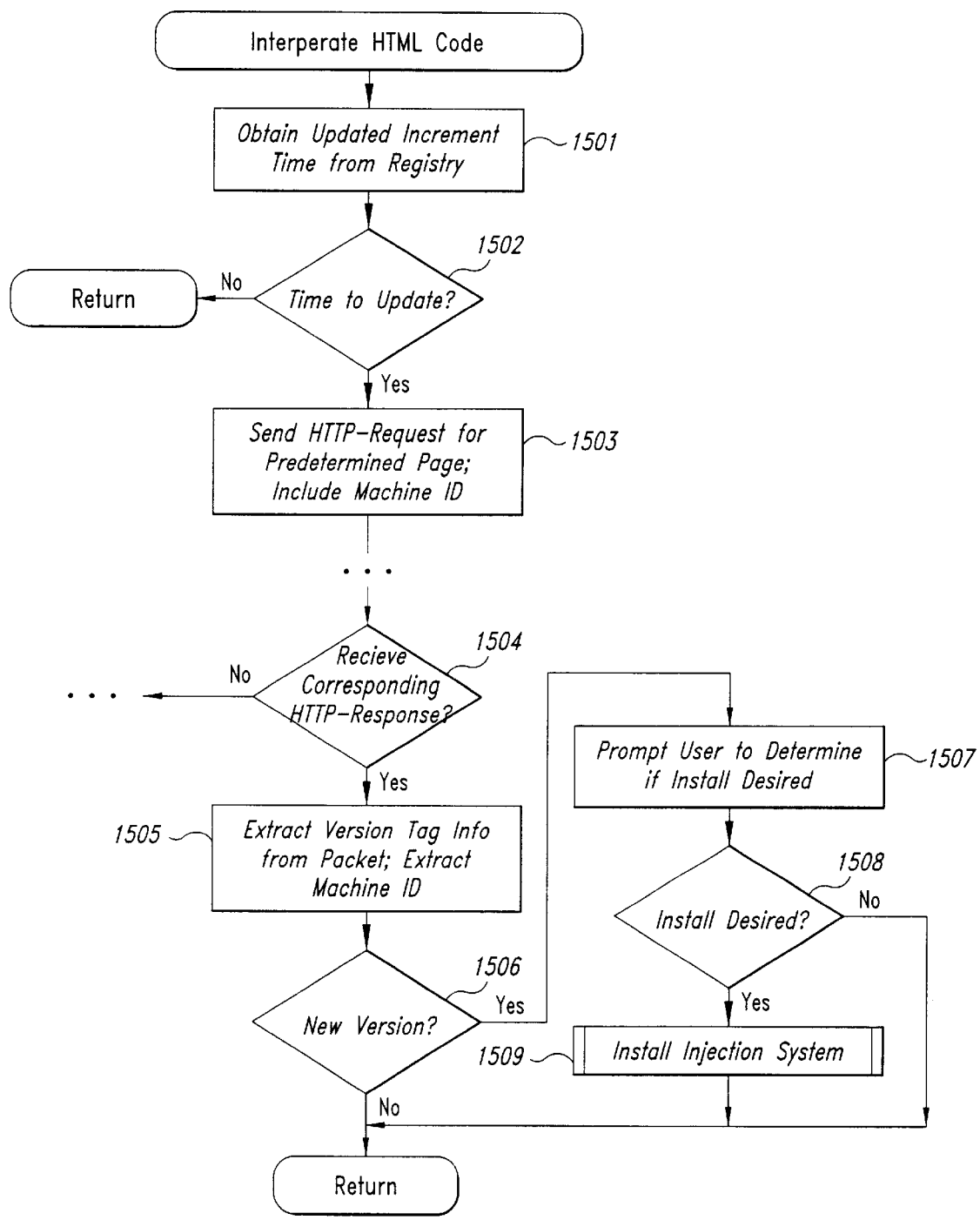
FIG. 15 is a flow diagram of the steps performed by the interceptor code to update the code that implements the injectable component.

FIG. 15 is a flow diagram of the steps performed by the interceptor code to update the code that implements the injectable component. In summary, a mechanism is provided that enables the server that provides the injectable component contents to provide new injectable component code on a client-by-client basis. The interceptor code determines whether there is new injectable component code available and, if so, prompts the user to determine whether the user desires to install the new component. In a preferred embodiment, the user of the client machine is able to indicate the frequency by which the interceptor code should periodically determine whether a new injectable component is available. In a preferred embodiment, the injectable component itself provides a user interface that enables the user to set the frequency of the periodic update. For example, the menu 309 shown in FIG. 3 could be used for this procedure. The designated frequency value is preferably stored as a property in global storage, such as within the class registry.

Specifically, in step 1501, the interceptor code retrieves the update frequency from a property in the registry. In step 1502, the interceptor code determines, based upon the retrieved update frequency, whether it is time to update and, if so, continues in step 1503, else returns. In step 1503, the interceptor code sends an HTTP-request for a predetermined document (page) to a predetermined location (the server source machine for the injectable component). Except for the first time that such a request is made, this request includes a machine identifier (machine_ID), which is specific to the client machine. This machine_ID is returned in the first response by the designated server to an update request. In this way, a unique machine identifier is assigned to each client machine. In step 1504, when a corresponding HTTP-response is received from the server that provides the injectable component, the interceptor code continues in step 1505, else continues with other processing. The HTTP-response received preferably includes the specific machine_ID of the client machine. The server preferably generates the unique machine_ID from a mechanism specific to that server machine, which is responsible for keeping track of each client. Any such mechanism for tracking client machine information and generating unique identifiers is operable. In step 1505, the interceptor code extracts version information from the HTTP message (and the machine_ID if this is the first such request). In step 1506, the interceptor code determines whether the indicated version is different from the version of the injectable component code currently installed on the user's machine and, if so, continues in step 1507, else returns. In step 1507, the interceptor code prompts the user to determine if the user wishes to install a new version of the injectable component code. In step 1508, if the user indicates that installation of the new version is desired, then the interceptor code continues in step 1509 to re-install the injection system as per FIG. 7, else returns.

Although the present invention has been described in terms of preferred embodiments, it is not intended that the invention be limited to these embodiments. Equivalent methods, structures, processes, steps, and other modifications within the spirit of the invention fall within the scope of the invention. The scope of the present invention is defined by the claims which follow.

What is claimed is:

1. A method in a computer system for conditionally incorporating an insertable component as part of a document, the method comprising:
   requesting the document;
   receiving the requested document;
   inserting code into the received document; and
   generating a display representing the received document by executing the inserted code wherein the inserted code
      determines whether the insertable component is already being displayed as part of an other document;
   when the insertable component is not already being displayed as part of said other document, incorporates the insertable component as part of the display representing the received document; and
   when the insertable component is already being displayed as part of said other document, does not incorporate the insertable component as part of the display representing the received document.

2. The method of claim 1 wherein the document represents a web page.

3. The method of claim 1 wherein the document is an HTML document.

4. The method of claim 1 wherein the generating of the display is performed by a browser.

5. The method of claim 1 wherein the inserting of code into the received document is performed by a proxy server.

6. The method of claim 1 including periodically updating the insertable component.

7. The method of claim 1 wherein the inserted code includes HTML tags that are used to create an ActiveX component.

8. The method of claim 1 wherein the inserted code includes HTML tags that are used to create a plug-in component.

9. The method of claim 1 wherein the inserted code includes a script.

10. The method of claim 9 wherein the script is a Java script.

11. The method of claim 9 wherein the script is a VB script.

12. The method of claim 1 wherein the insertable component is a user interface element.

13. The method of claim 1 wherein the insertable component is an HTML frame.

14. A system for conditionally incorporating an insertable component as part of a document, comprising:
a first component that inserts code into the document; and
a second component that generates a display representing the document by executing the inserted code wherein the inserted code
determines whether the insertable component is already being displayed as part of an other document;
when the insertable component is not already being displayed as part of said document, incorporates the insertable component as part of the display representing the document; and
when the insertable component is already being displayed as part of said other document, does not incorporate the insertable component as part of the display representing the document.

15. The system of claim 14 wherein the document represents a web page.

16. The system of claim 15 wherein the document is an HTML document.

17. The system of claim 15 wherein the second component is a browser that directs the execution of the inserted code.

18. The system of claim 15 wherein the first component is a proxy server.

19. The system of claim 15 including a third component that periodically updates the insertable component.

20. The system of claim 15 wherein the inserted code includes HTML tags that are used to create an ActiveX component.

21. The system of claim 15 wherein the inserted code includes HTML tags that are used to create a plug-in component.

22. The system of claim 15 wherein the inserted code includes a script.

23. The system of claim 22 wherein the script is a Java script.

24. The system of claim 22 wherein the script is a VB script.

25. The system of claim 15 wherein the insertable component is a user interface element.

26. The system of claim 15 wherein the insertable component is an HTML frame.

27. A computer-readable medium containing instructions for causing a computer system to conditionally incorporate an insertable component as part of a document when generating a display representing the document, by:
determining whether the insertable component is already being displayed as part of an other document;
when the insertable component is not already being displayed, incorporating the insertable component as part of the display representing the document; and
when the insertable component is already being displayed as part of an other document, not incorporating the insertable component as part of the display representing the document.

28. The computer readable medium of claim 27 wherein the document represents a web page.

29. The computer-readable medium of claim 27 wherein the document is an HTML document.

30. The computer-readable medium of claim 27 wherein the instructions create an ActiveX component.

31. The computer-readable medium of claim 27 wherein the instructions create a plug-in component.

32. The computer-readable medium of claim 27 wherein the insertable component is a user interface element.

33. The computer-readable medium of claim 27 wherein the insertable component is an HTML frame.

34. A computer program for conditionally incorporating an insertable component as part of a document when generating a display representing the document, by:
determining whether the insertable component is already being displayed as part of an other document;
when the insertable component is not already being displayed as part of an other document, incorporating the insertable component as part of the display representing the document; and
when the insertable component is already being displayed as part of an other document, not incorporating the insertable component as part of the display representing the document.

* * * * *